United States Patent
Cha et al.

(10) Patent No.: US 11,460,894 B2
(45) Date of Patent: Oct. 4, 2022

(54) UNDER-DISPLAY CAMERA

(71) Applicant: SAMSUNG ELECTRONICS CO., LTD., Suwon-si (KR)

(72) Inventors: Sungho Cha, Anyang-si (KR); Sungsu Kim, Yongin-si (KR); Taehyung Kim, Hwaseong-si (KR); Seunghyeok June, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/461,206

(22) Filed: Aug. 30, 2021

(65) Prior Publication Data
US 2022/0206545 A1    Jun. 30, 2022

(30) Foreign Application Priority Data
Dec. 31, 2020    (KR) .................. 10-2020-0189709

(51) Int. Cl.
| G06T 7/80 | (2017.01) |
| H04N 5/235 | (2006.01) |
| G06F 1/16 | (2006.01) |
| H04N 17/00 | (2006.01) |

(52) U.S. Cl.
CPC .............. *G06F 1/1686* (2013.01); *G06T 7/80* (2017.01); *H04N 17/002* (2013.01)

(58) Field of Classification Search
CPC ....... G06T 7/80; H04N 5/2351; H04N 5/2354
See application file for complete search history.

(56) References Cited

U.S. PATENT DOCUMENTS

| 7,116,823 B2 | 10/2006 | Clark et al. |
| 9,019,253 B2* | 4/2015 | Drzaic ................ G09G 5/02 345/207 |
| 9,225,905 B2* | 12/2015 | Yoon ................ H04N 5/232935 |

(Continued)

FOREIGN PATENT DOCUMENTS

| CN | 103778415 A | 5/2014 |
| CN | 108833770 A | 11/2018 |

(Continued)

OTHER PUBLICATIONS

Sungho Cha, et al. "Quantitative Image Quality Evaluation Method for UDC (Under Display Camera)", IS&T International Symposium on Electronic Imaging 2021, Society for Imaging Science and Technology, Jun. 8, 2021 (5 total pages).

*Primary Examiner* — Brian P Yenke
(74) *Attorney, Agent, or Firm* — Sughrue Mion, PLLC

(57) ABSTRACT

An under-display camera is provided, wherein an image acquisition unit including the under-display camera is configured to generate an evaluation image based on a first light, by using an imaging unit including an image sensor. The first light is output by a light emitting unit, including a light source, and passes through a display panel. The under-display camera is controlled based on a result of evaluating a performance of the under-display camera, the result being obtained by calculating a feature value based on the evaluation image, calculating a reference value based on a reference image, and comparing the feature value with the reference value, the reference image being obtained based on a second light output by the light emitting unit, the second light not passing the display panel.

20 Claims, 16 Drawing Sheets

(56) References Cited

U.S. PATENT DOCUMENTS

| | | | |
|---|---|---|---|
| 9,390,646 B2* | 7/2016 | Park | G09G 3/2003 |
| 9,774,839 B2* | 9/2017 | Coon | H04N 9/735 |
| 9,892,514 B2* | 2/2018 | Maguire | H04N 1/00 |
| 10,165,194 B1* | 12/2018 | Baldwin | H04N 9/04555 |
| 10,713,764 B2* | 7/2020 | Kim | G06T 5/40 |
| 11,069,104 B1* | 7/2021 | Kuang | G02B 27/0172 |
| 11,089,220 B2* | 8/2021 | Cha | H04N 5/2328 |
| 11,128,809 B2* | 9/2021 | Zhen | G06T 5/50 |
| 11,153,520 B2* | 10/2021 | Park | H04N 5/23264 |
| 11,184,595 B2* | 11/2021 | Chang | H04N 9/735 |
| 11,294,422 B1* | 4/2022 | Srikanth | G06F 1/1637 |
| 2010/0201823 A1 | 8/2010 | Zhang | H04N 5/33 348/162 |
| 2011/0205259 A1* | 8/2011 | Hagood, IV | G09G 3/3413 345/690 |
| 2012/0075435 A1* | 3/2012 | Hovanky | H04N 13/257 348/51 |
| 2013/0314549 A1* | 11/2013 | Higuchi | H04N 17/002 348/175 |
| 2014/0036108 A1* | 2/2014 | Yoon | H04N 5/232 348/222.1 |
| 2016/0356647 A1* | 12/2016 | Wiegand | G01J 3/027 |
| 2017/0091941 A1* | 3/2017 | Atkinson | G01J 3/10 |
| 2017/0270342 A1* | 9/2017 | He | G06V 40/1318 |
| 2017/0332000 A1* | 11/2017 | Wang | H04N 13/232 |
| 2018/0038734 A1* | 2/2018 | Atkinson | H04N 17/002 |
| 2019/0392772 A1* | 12/2019 | Kriebernegg | G09G 3/3406 |
| 2020/0389576 A1* | 12/2020 | Newman | H04N 5/217 |
| 2021/0042962 A1* | 2/2021 | Zhang | G06T 7/80 |
| 2021/0136291 A1* | 5/2021 | Chu | H04M 1/0266 |
| 2021/0223664 A1* | 7/2021 | Maharshi | H04N 5/2176 |
| 2021/0297637 A1* | 9/2021 | Chang | H04N 9/0451 |
| 2022/0046215 A1 | 2/2022 | Cha et al. | |
| 2022/0116519 A1* | 4/2022 | Nikhara | H04N 5/2257 |

FOREIGN PATENT DOCUMENTS

| | | |
|---|---|---|
| CN | 110460825 A | 11/2019 |
| CN | 111445464 A | 7/2020 |
| KR | 1020220017649 A | 2/2022 |

* cited by examiner

| ANALYSIS METHOD | | FIRST FEATURE VALUE | PERFORMANCE EVALUATION RESULT | REFERENCE VALUE |
|---|---|---|---|---|
| | Mean | X1 | 75% | X0 |
| | STDEV | Y1 | 10% | Y0 |
| | Amplitude | Z1 | 15% | Z0 |
| | Sub score | | 33.3% | |

FIG. 14

| ANALYSIS METHOD | FIRST FEATURE VALUE | | | | SECOND FEATURE VALUE | | | | REFERENCE VALUE | |
|---|---|---|---|---|---|---|---|---|---|---|
| | FIRST CONDITION | PERFORMANCE EVALUATION RESULT | SECOND CONDITION | PERFORMANCE EVALUATION RESULT | FIRST CONDITION | PERFORMANCE EVALUATION RESULT | SECOND CONDITION | PERFORMANCE EVALUATION RESULT | FIRST CONDITION | SECOND CONDITION |
| Mean | X11 | 75% | X12 | 80% | X21 | 85% | X22 | 90% | X01 | X02 |
| STDEV | Y11 | 10% | Y12 | 15% | Y21 | 30% | Y22 | 45% | Y01 | Y02 |
| Amplitude | Z11 | 15% | Z12 | 20% | Z21 | 35% | Z22 | 50% | Z01 | Z02 |
| | Sub score | 33.3% | Sub score | 38.3% | Sub score | 50% | Sub score | 61.6% | | |

FIG. 16

UNDER-DISPLAY CAMERA

CROSS TO REFERENCE TO RELATED APPLICATION(S)

This application claims priority to Korean Patent Application No. 10-2020-0189709 filed on Dec. 31, 2020 in the Korean Intellectual Property Office, the disclosure of which is incorporated herein by reference in its entirety.

BACKGROUND

Example embodiments of the present disclosure relate to an under-display camera.

With the development of the mobile industry, display technology included in mobile phones has also been developed. Current display technology has been developed to increase a screen share of a display panel. Also, with respect to a front camera of a mobile phone, a technique of increasing a screen share of a display panel may have an excellent effect in terms of product design, but there may be a limitation in that image quality may be deteriorated. Particularly, with respect to deterioration of image quality occurring in an under-display camera (UDC) which may increase an area in which a display panel may be disposed, there is a difficulty in evaluating accurate UDC performance.

SUMMARY

One or more example embodiments provide an under-display camera (UDC) which may, by calculating a numerical feature value based on an evaluation image obtained by an imaging unit through a display panel, quantitatively evaluate performance of the UDC, and may have improved performance.

According to an aspect of an example embodiment, there is provided an under-display camera configured to, when disposed below a display, generate an image based on a light passing through the display, wherein an image acquisition unit including the under-display camera is configured to generate an evaluation image based on a first light, by using an imaging unit including an image sensor, the first light being output by a light emitting unit, including a light source, and passing through a display panel, and wherein the under-display camera is controlled based on a result of evaluating a performance of the under-display camera, the result being obtained by calculating a feature value based on the evaluation image, calculating a reference value based on a reference image, and comparing the feature value with the reference value, the reference image being obtained based on a second light output by the light emitting unit, the second light not passing the display panel.

According to an aspect of an example embodiment, there is provided an under-display camera configured to, when disposed below a display, generate an image based on a light passing through the display, wherein an image acquisition unit including the under-display camera is configured to generate an evaluation image based on a first light, by using an imaging unit including an image sensor, the first light being output by a light emitting unit, including a light source, and passing through a display panel, and wherein the under-display camera is controlled based on a result of evaluating a performance of the under-display camera, the result being obtained by converting the evaluation image to a contour image; calculating, in each of a plurality of positions on an outline of the contour image, a feature value based on a relative location of each position with respect to a center of the contour image; and comparing the feature value with a reference value obtained from a reference image, the reference image being obtained based on a second light not passing through the display panel.

According to an aspect of an example embodiment, there is provided an under-display camera configured to, when disposed below a display, generate an image based on a light passing through the display, wherein an image acquisition unit including the under-display camera is configured to generate a first evaluation image and a second evaluation image based on a first light, by using an imaging unit including an image sensor, the first light being output by a light emitting unit, including a light source, and passing through a display panel, and wherein the under-display camera is controlled based on a result of evaluating a performance of the under-display camera, the result being obtained by calculating a first feature value based on the first evaluation image and calculating a second feature value based on the second evaluation image; and obtaining a first performance evaluation result by comparing the first feature value with a reference value obtained from a reference image and obtaining a second performance evaluation result by comparing the second feature value with the reference value, the reference image being obtained based on a second light not passing through the display panel.

BRIEF DESCRIPTION OF DRAWINGS

The above and other aspects, features, and advantages of the disclosure will be more apparent from the following detailed description of example embodiments taken in conjunction with the accompanying drawings, in which:

FIG. 14 is a diagram illustrating a performance evaluation result of a method of evaluating performance of an under-display camera according to an example embodiment;

FIG. 16 is a diagram illustrating a performance evaluation result of a method of evaluating performance of an under-display camera according to an example embodiment.

DETAILED DESCRIPTION

Hereinafter, example embodiments of the disclosure will be described as follows with reference to the accompanying drawings.

Figure 1:
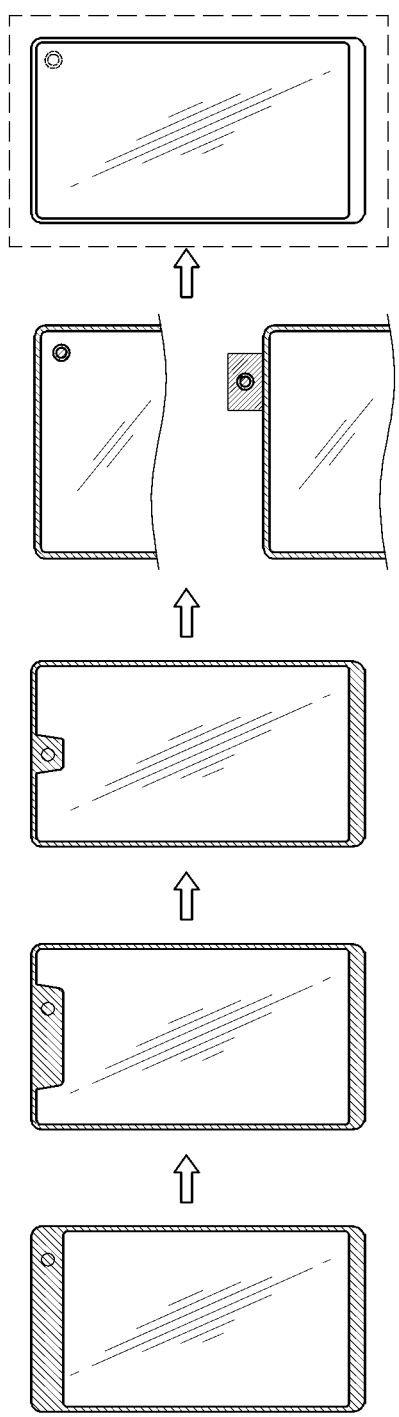
FIG. 1 illustrates development of a camera provided with a display panel.

FIG. 1 illustrates development of a camera provided with a display panel.

Referring to FIG. 1, a display panel and an imaging unit (e.g., camera) included in a mobile phone have been developed to improve a screen share (or a screen occupancy rate) of a display panel. For example, an earlier mobile phone included a rectangular display panel and an image unit may be disposed to be exposed on an external bezel, while in later mobile phones, a shape of a display has been changed such that an area of the external bezel is decreased, as shown in FIG. 1.

Recently, to further increase a screen share of a display panel, a method of removing an external bezel and providing a camera by drilling a hole in the display panel in a pop-up form has been developed. Also, a product equipped with an under-display camera (UDC), which is disposed under a display, has been developed as a method to maximize a screen share of a display panel.

However, in an under-display camera, since light should enter a lens of a camera through a display panel, transmittance of light may be lowered. Also, an opaque area having a predetermined pattern arrangement on a display panel may further lower transmittance of light entering thereto. Accordingly, performance of an under-display camera may be directly related to quality of an obtained image, and the development of an under-display camera needs to overcome the issues such as color shift, deterioration of resolution, and the like.

In the related art, a method of qualitatively evaluating performance of a camera with the naked eye is used, which is not accurate. According to example embodiments, a quantitative performance evaluation method may be used to improve performance of an under-display camera.

An improved under-display camera according to example embodiments may be applied to mobile phones and also to electronic devices such as laptops and televisions.

Figure 2:
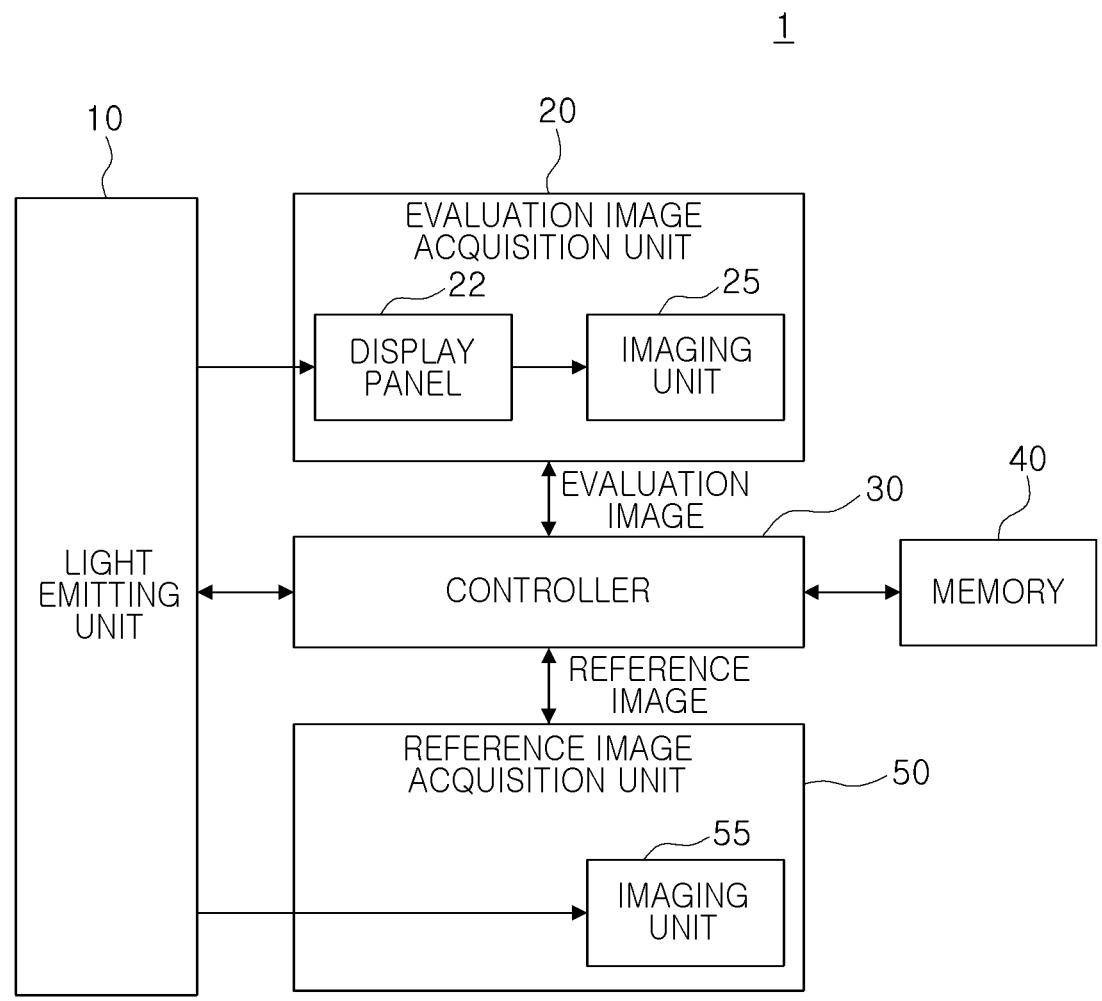
FIG. 2 is a block diagram illustrating a device for evaluating performance of an under-display camera according to an example embodiment.

FIG. 2 is a block diagram illustrating a device for evaluating performance of an under-display camera according to an example embodiment.

Referring to FIG. 2, a device 1 for evaluating performance of an under-display camera in an example embodiment may quantitatively evaluate performance of the camera. The performance evaluation device 1 may include a light emitting unit 10, an evaluation image acquisition unit 20, a controller 30, a memory 40, and a reference image acquisition unit 50.

The light emitting unit 10 may allow light to be incident to the reference image acquisition unit 50 and/or the evaluation image acquisition unit 20 to generate a reference image and/or an evaluation image. Performance of the evaluation image acquisition unit 20 may be evaluated according to an example embodiment based on the reference image and the evaluation image. Accordingly, the light emitting unit 10 may allow light to be incident to the reference image acquisition unit 50 and the evaluation image acquisition unit 20 under the same conditions. However, an example embodiment is not limited thereto.

The evaluation image acquisition unit 20 may be configured to include an under-display camera, and may include a display panel 22 and an imaging unit 25. For example, the display panel 22 and the imaging unit 25 may be disposed in order in a direction in which light is incident. Light incident from the light emitting unit 10 may pass through the display panel 22 and may be input to the imaging unit 25. The display panel 22 may include an opaque area having a regular pattern, and the imaging unit 25 may generate an evaluation image having deteriorated image quality due to the opaque area of the display panel 22. The generated evaluation image may be converted or analyzed by the controller 30, and data generated in this process may be stored in the memory 40.

The reference image acquisition unit 50 may be configured such that an under-display camera is not included, and may include an imaging unit 55. For example, light incident from the light emitting unit 10 may be directly incident to the imaging unit 55. The imaging unit 55 may generate a reference image by imaging incident light. Since the reference image is a comparison target to evaluate performance of the evaluation image acquisition unit 20 by analyzing the evaluation image, the imaging unit 55 included in the reference image acquisition unit 50 may be configured to have the same performance as that of the imaging unit 25 included in the evaluation image acquisition unit 20.

The generated reference image may be converted or analyzed by the controller 30, and data generated in this process may be stored in the memory 40. A frequency of generating the reference image may not be limited to an example embodiment. As an example, performance of the evaluation image acquisition unit 20 may be evaluated based on a plurality of evaluation images using the reference image generated once. As another example, performance of the evaluation image acquisition unit 20 may be evaluated by generating a reference image corresponding to the evaluation image whenever the evaluation image is generated.

The controller 30 may quantify information related to the evaluation image and the reference image generated by the evaluation image acquisition unit 20 and the reference image acquisition unit 50, respectively, and may compare the quantified information, thereby evaluating performance of the evaluation image acquisition unit 20. For example, a method of calculating a feature value by quantifying information related to the evaluation image may correspond to a method of calculating a reference value by quantifying information related to the reference image. A process of calculating the feature value and the reference value will be described in greater detail later.

As an example, the controller 30 may quantify a degree to which an image of an area having the same light intensity from each image is similar to a circular shape, and may compare the degrees with each other. The controller 30 may output a performance evaluation result with respect to the evaluation image acquisition unit 20 by comparing the feature value related to the evaluation image with the reference value related to the reference image. For example, the controller 30 may store the performance evaluation result of the evaluation image acquisition unit 20 in the memory 40.

However, an example embodiment is not limited thereto. As an example, the performance evaluation device 1 may further include additional elements if desired. Also, the controller 30 may further perform other functions in addition to the described functions, and the memory 40 may store at least a portion of data generated until the result of evaluating performance of the evaluation image acquisition unit 20 is obtained after the evaluation image and the reference image are generated.

Figure 3:
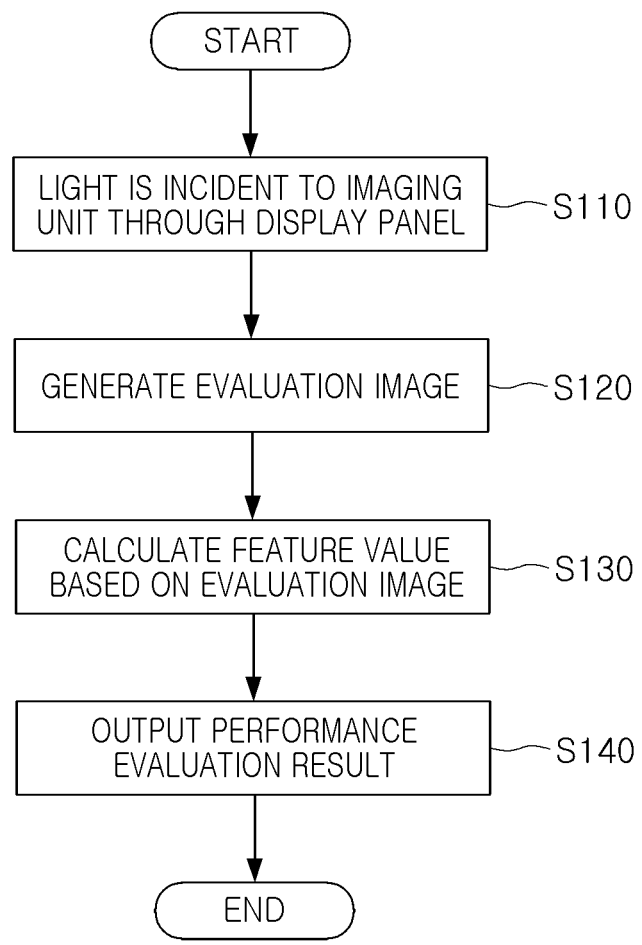
FIG. 3 is a flowchart illustrating a method of evaluating performance of an under-display camera according to an example embodiment.

FIG. 3 is a flowchart illustrating a method of evaluating performance of an under-display camera according to an example embodiment.

Referring to FIG. 3, performance of an under-display camera may be evaluated using a feature value quantified based on the evaluation image generated according to an example embodiment.

Referring to FIGS. 2 and 3, light may be incident to the imaging unit 25 through the display panel 22 (S110). The imaging unit 25 may generate the evaluation image by imaging the incident light (S120).

As an example, since the evaluation image is obtained by imaging light passing through the display panel 22, image quality of the evaluation image may be deteriorated as compared to that of a general image, which is obtained by imaging light that has not passed through the display panel 22. The information of image quality deterioration may be included in the evaluation image, and the controller 30 may calculate, based on the evaluation image, a feature value, in which the information of image quality deterioration is reflected (S130). Based on the feature value, the controller 30 may output a result of evaluating performance of the evaluation image acquisition unit 20 including the under-display camera (S140).

However, the operations of the method for evaluating the performance illustrated in FIG. 3 are merely an example and an example embodiment is not limited thereto. As an example, additional operations may be further included prior to, between, or after operations S110 to S140, or some of operations described in FIG. 3 may be omitted or modified.

Figure 4A:
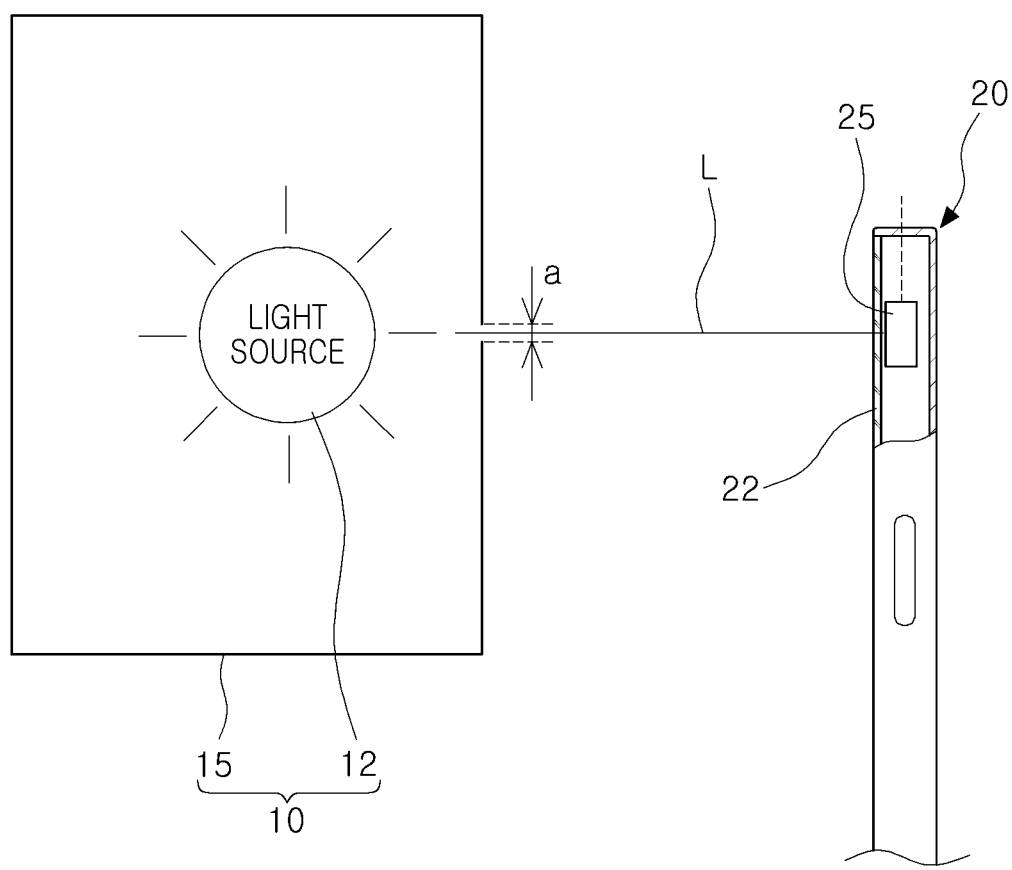
FIGS. 4A and 4B illustrate evaluating performance of an under-display camera according to example embodiments.
Figure 4B:
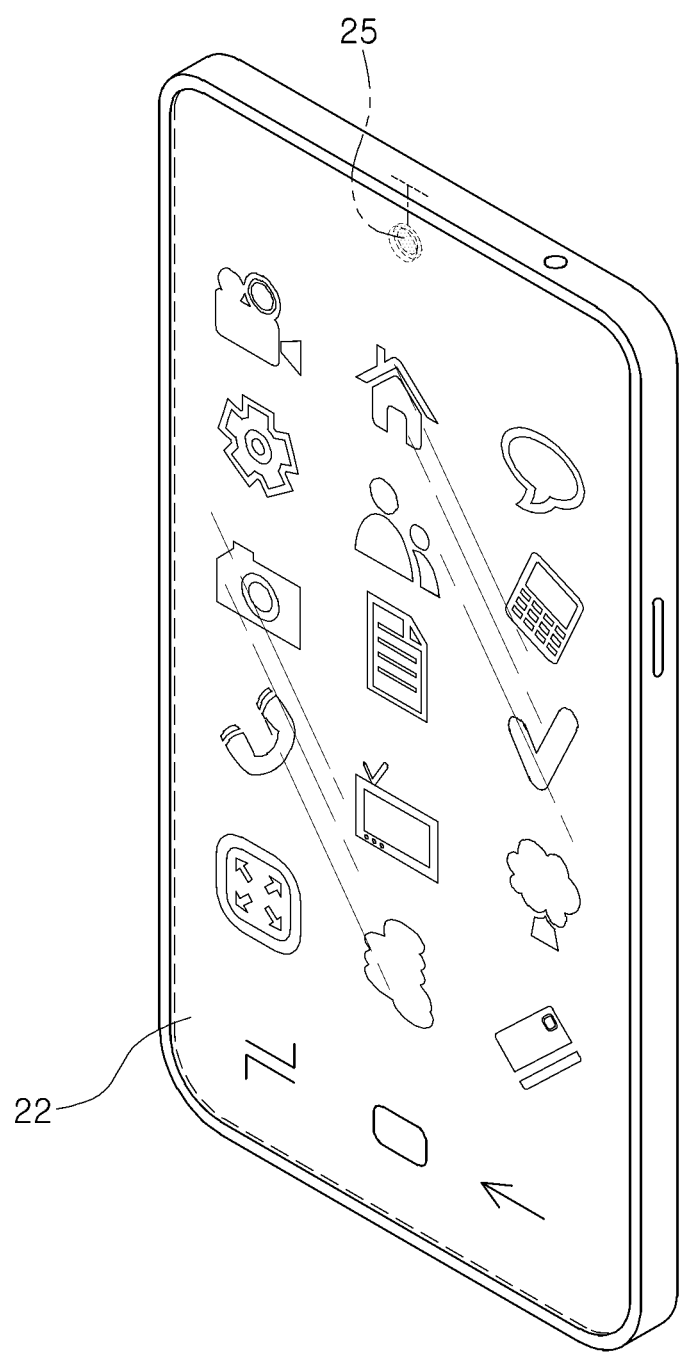

FIGS. 4A and 4B are diagrams illustrating evaluating performance of an under-display camera according to example embodiments.

FIG. 4A illustrates a process in which light L output by the light emitting unit 10 is incident to the evaluation image acquisition unit 20.

In an example embodiment, the light emitting unit 10 may include a light source 12 and a shielding box 15. For example, the light emitting unit 10 may be configured as a point light source, the shielding box 15 may include a slit, and a point light source may be disposed in the shielding box 15.

The slit of the shielding box 15 may have a predetermined width a. As an example, the predetermined width a may be a value between 1 mm and 3 mm. However, an example embodiment is not limited thereto. For example, the predetermined width a may have a value less than 1 mm or greater than 3 mm.

The light emitting unit 10 may output light L that moves linearly in one direction through the slit of the shielding box 15. The output light L may be incident to the evaluation image acquisition unit 20. As an example, the evaluation image acquisition unit 20 may be configured to include an under-display camera. Accordingly, the incident light L may be incident to the imaging unit 25 through the display panel 22. For example, the incident light L may be vertically incident to the display panel 22 and the imaging unit 25.

However, an example embodiment is not limited to the example illustrated in FIG. 4A, and the light emitting unit 10 configured to output the light L that moves linearly in one direction may be implemented in various forms.

FIG. 4B may be an example embodiment of the evaluation image acquisition unit 20 in the form of a mobile phone.

However, an example embodiment is not limited thereto, and the form of the evaluation image acquisition unit 20 may not be limited to the illustrated example.

As an example, the evaluation image acquisition unit 20 may include the display panel 22 and the imaging unit 25. The display panel 22 may correspond to a screen of a mobile phone, and the imaging unit 25 may correspond to a front camera of the mobile phone. As an example, the display panel 22 may be configured to completely cover the imaging unit 25, and as described with reference to FIG. 4A, light incident to the display panel 22 may pass through the display panel 22 and may be incident to the imaging unit 25. The imaging unit 25 may generate an evaluation image for evaluating performance of the evaluation image acquisition unit 20 based on the incident light.

Figure 5:
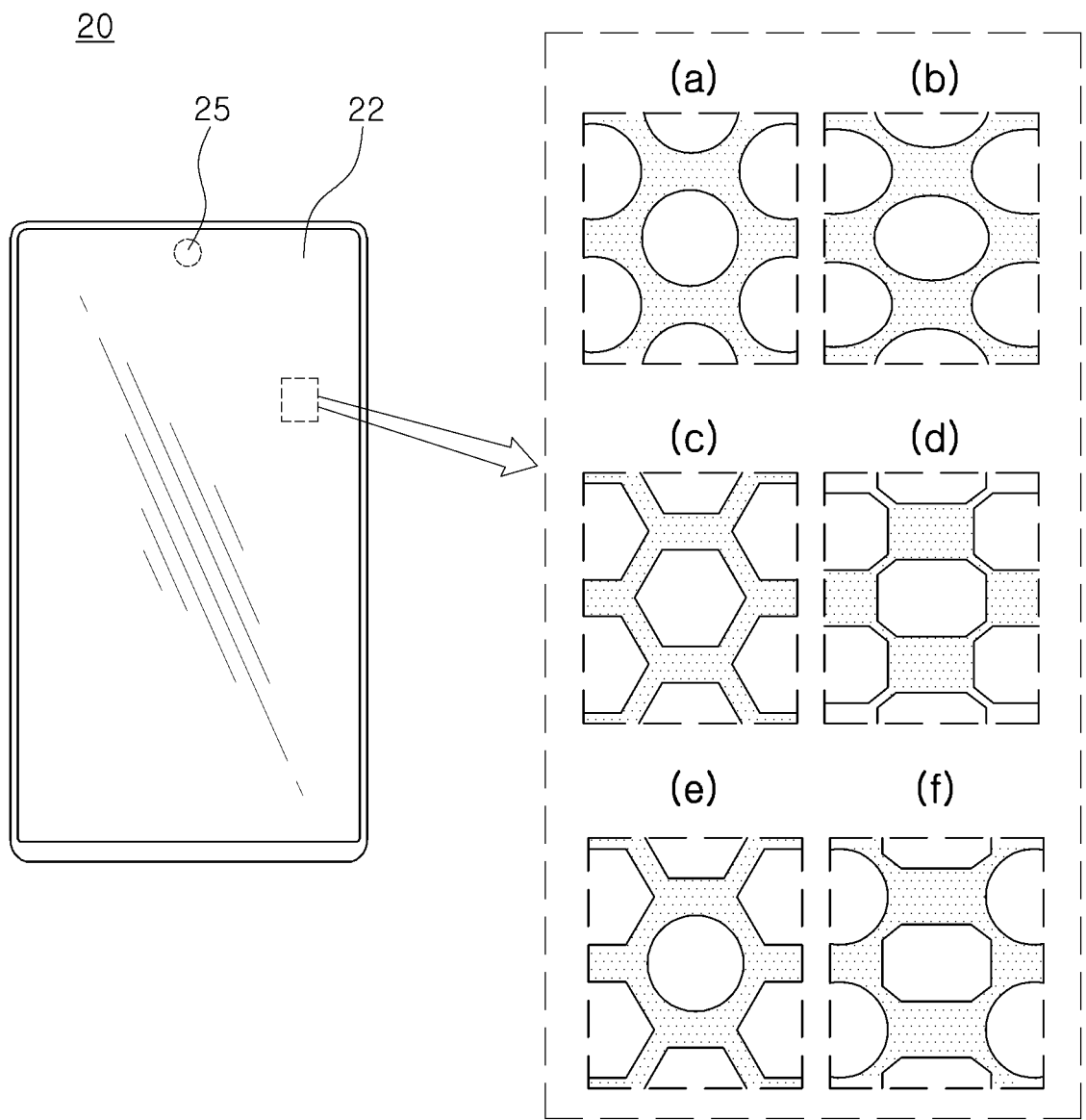
FIG. 5 is a diagram illustrating a display panel for applying a method of evaluating performance of an under-display camera according to an example embodiment.

FIG. 5 is a diagram illustrating a display panel for applying a method of evaluating performance of an under-display camera according to an example embodiment.

Referring to FIG. 5, an evaluation image acquisition unit 20 for applying a method of evaluating performance of an under-display camera in an example embodiment may include a display panel 22 and an imaging unit 25.

The display panel 22 may include a regular predetermined pattern, examples of which are illustrated in (a) to (f) in FIG. 5. The predetermined patterns may include an opaque area, and light incident to the display panel 22 may cause a diffraction phenomenon due to the predetermined patterns. Also, the opaque area included in the predetermined patterns may reduce the amount of light incident to the imaging unit 25. For example, the amount of light incident to the imaging unit 25 may be further reduced in a range of about 50% to 90% than light incident to the display panel 22. Accordingly, the evaluation image generated by the imaging unit 25 may have deteriorated quality.

A shape of the evaluation image generated in an example embodiment may be determined based on a predetermined pattern included in the display panel 22. With respect to the method of evaluating performance of the under-display camera in an example embodiment, since a performance evaluation result may be obtained from the evaluation image, the predetermined pattern included in the display panel 22 may directly affect the performance evaluation result.

Referring to pattern (a), the display panel 22 may include a pattern having a regular circular hole therein. Referring to pattern (b), the display panel 22 may include a pattern having regular oval-shaped holes therein. Also, referring to patterns (c) and (d), the display panel 22 may include a pattern having holes of a polygonal shape, such as hexagons or octagons, therein.

However, the predetermined pattern included in the display panel 22 is not limited thereto, and the display panel 22 may include a pattern having a circular hole and polygonal holes surrounding the circular hole, as illustrated in pattern (e). Also, as illustrated in pattern (f), the display panel 22 may include a pattern having holes of the same shape at positions arranged in one direction and holes of different shapes at different positions in one direction. However, the patterns included in the display panel 22 are not limited to the examples illustrated in (a) to (f), and the display panel 22 may include patterns having various shapes.

Figure 6:
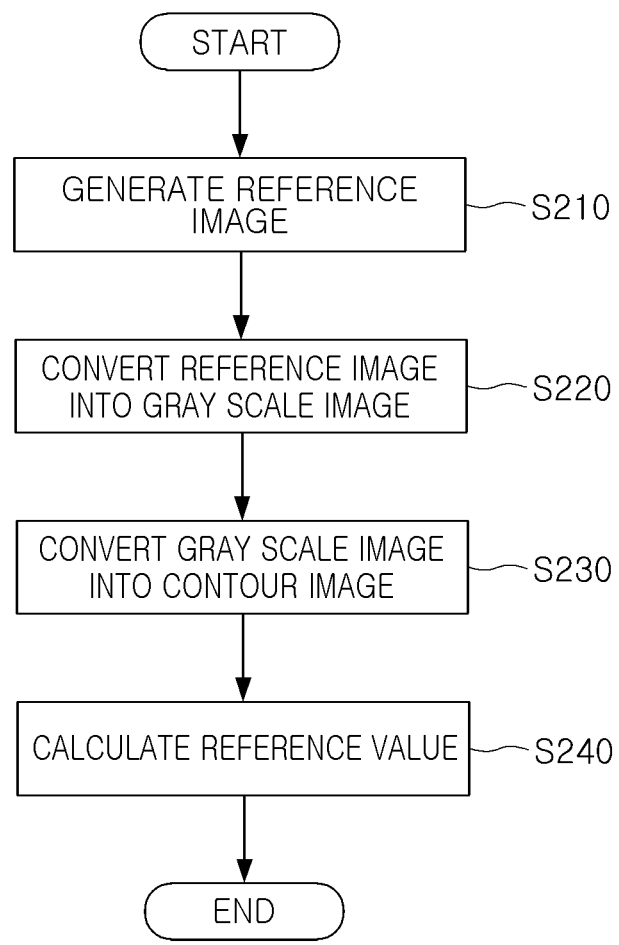
FIG. 6 is a flowchart illustrating a method of evaluating performance of an under-display camera according to an example embodiment.

FIG. 6 is a flowchart illustrating a method of evaluating performance of an under-display camera according to an example embodiment.

FIG. 6 illustrates a method of calculating a reference value to evaluate performance of an under-display camera according to an example embodiment.

Referring back to FIG. 2, the reference image acquisition unit 50 may generate a reference image by imaging light incident from the light emitting unit 10 (S210). Since light incident to the reference image acquisition unit 50 is directly incident to the imaging unit 55 without passing through a display panel, the reference image may be a general image having less deterioration in image quality.

The controller 30 may convert the generated reference image into a gray scale image (e.g., black and white image) (S220), and may convert the converted gray scale image into a contour image (S230). Based on operation S220 of converting the reference image into the gray scale image to generate the contour image, accuracy of analysis of the contour image may be improved. However, an example embodiment is not limited thereto, and the reference image may be directly converted into a contour image without performing operation S220.

The controller 30 may calculate a reference value based on the generated contour image (S240). As an example, the reference value may be obtained by quantifying a degree to which an image of an area having the same light intensity in the reference image is similar to a circular shape. For example, since the reference image is a general image with less deterioration in image quality, an image of an area having the same light intensity may appear similar to a circular shape. Accordingly, the reference value may include image information of when there is less deterioration in image quality.

Figure 7:
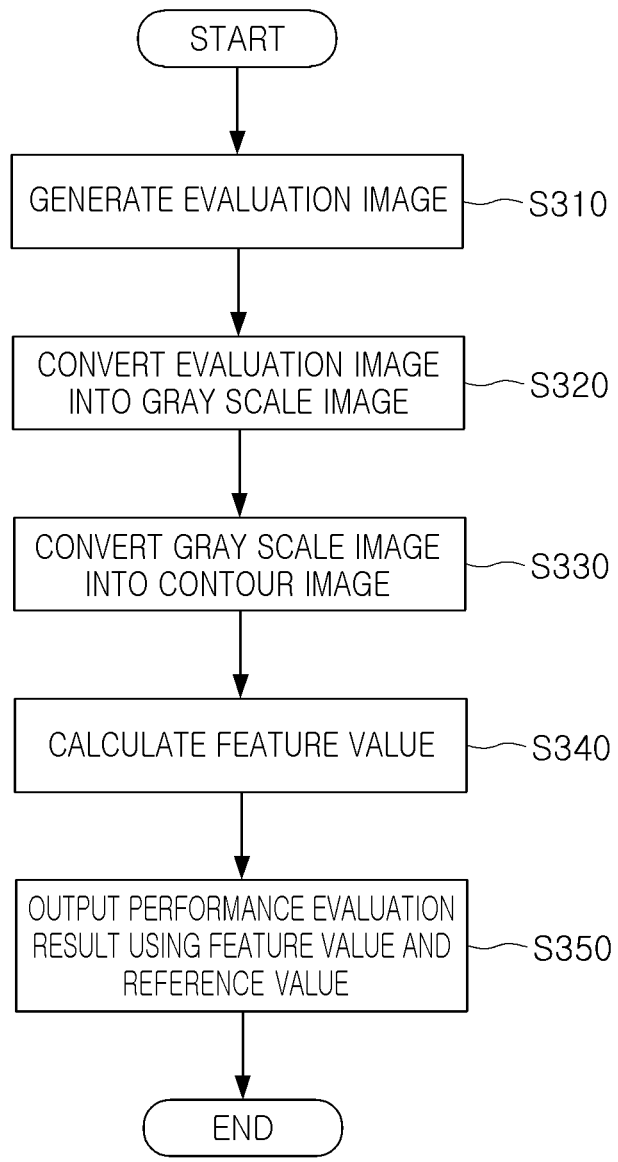
FIG. 7 is a flowchart illustrating a method of evaluating performance of an under-display camera according to an example embodiment.

FIG. 7 is a flowchart illustrating a method of evaluating performance of an under-display camera according to an example embodiment.

FIG. 7 illustrates a method of calculating a feature value for evaluating performance of an under-display camera for comparison with a pre-calculated reference value according to an example embodiment.

Referring back to FIG. 2, the imaging unit 25 included in the evaluation image acquisition unit 20 may generate an evaluation image by imaging incident light passing through the display panel 22 (S310). As described above, the evaluation image may appear to have deteriorated quality.

Similarly to the method of converting the reference image illustrated in FIG. 6, the controller 30 may convert the generated evaluation image into a gray scale image (e.g., black and white image) (S320), and may convert the converted gray scale image into a contour image again. (S330). However, an example embodiment is not limited thereto, and the evaluation image may be directly converted into a contour image without performing operation S320.

The controller 30 may calculate a feature value based on the generated contour image (S340). Similarly to the reference value, the feature value may be obtained by quantifying a degree to which an image of an area having the same light intensity in the evaluation image is similar to a circular shape. Since the evaluation image has deteriorated image quality, the feature value may include image information different from that of the reference value.

In an example embodiment, a result of evaluating performance of the evaluation image acquisition unit 20 may be calculated by comparing the feature value with the reference value (S350). Accordingly, how similar the evaluation image is to a circular shape and how much noise has been generated may be predicted.

Figure 8:
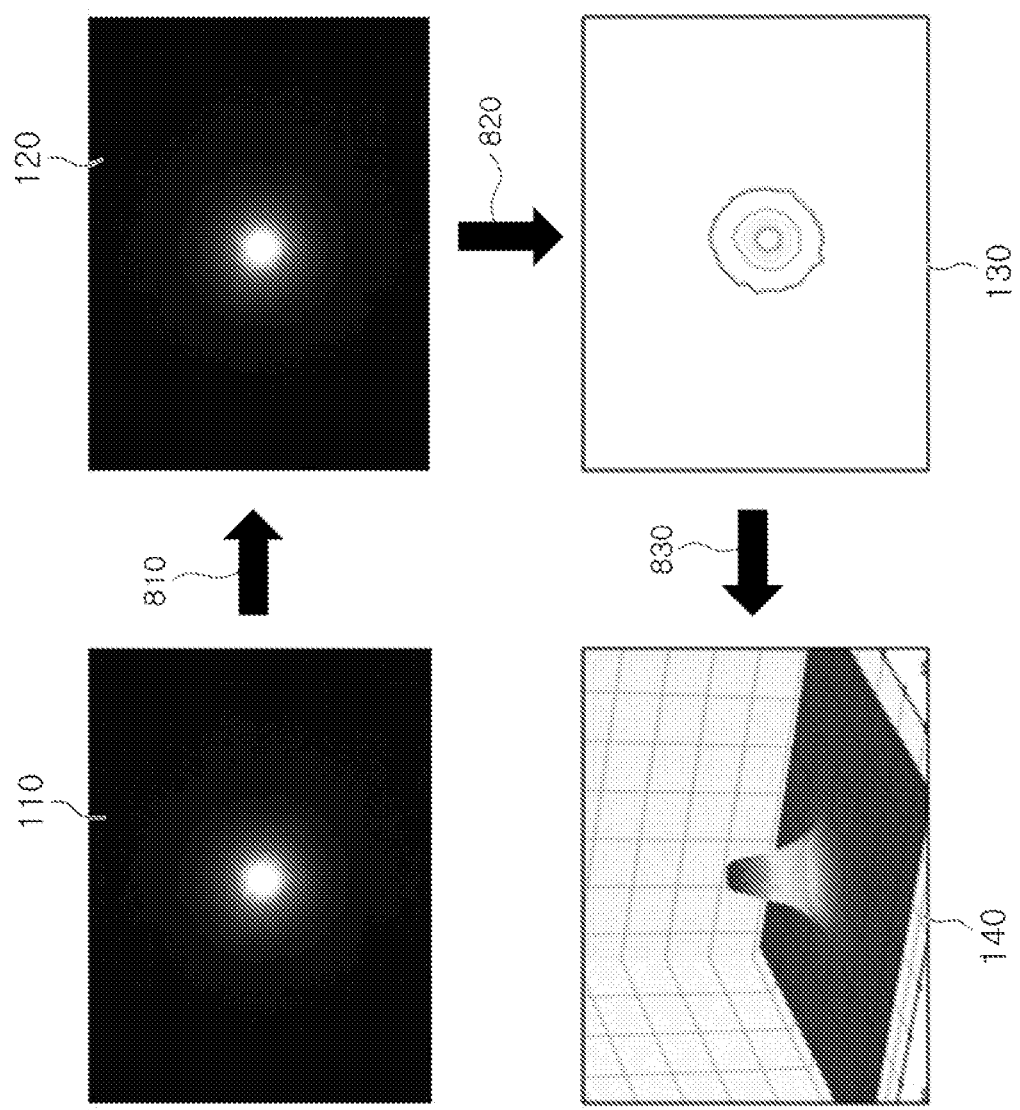
FIGS. 8 and 9 are diagrams illustrating images generated using a method of evaluating performance of an under-display camera according to example embodiments.
Figure 9:
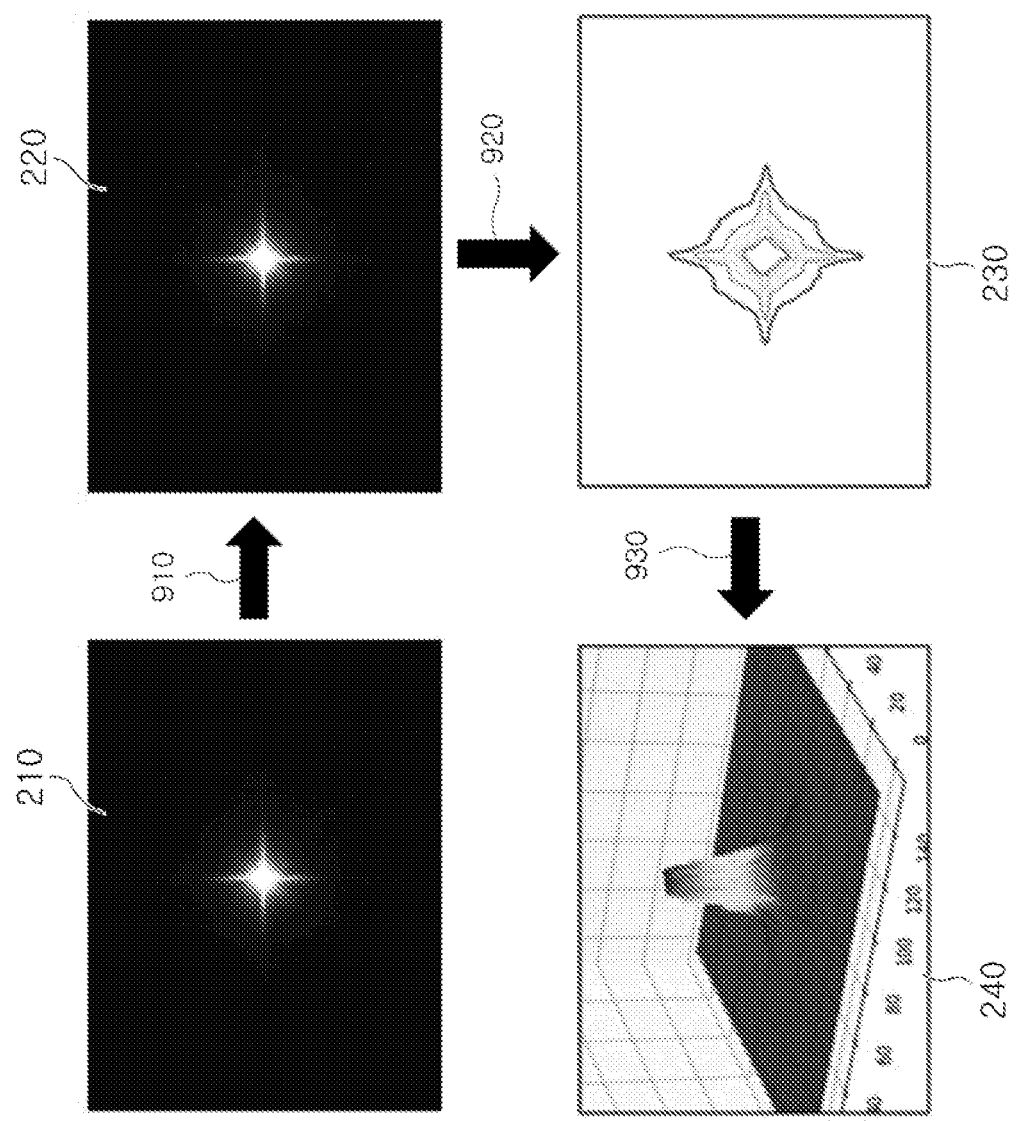

FIGS. 8 and 9 are diagrams illustrating images generated using a method of evaluating performance of an under-display camera according to an example embodiment.

FIGS. 8 and 9 illustrate examples of the images described in the flowcharts in FIGS. 6 and 7. As an example, the images illustrated in FIG. 8 may be related to the reference image acquisition unit corresponding to FIG. 6, and the images illustrated in FIG. 9 may be related to the evaluation image acquisition unit corresponding to FIG. 7.

Referring to FIG. 8, a reference image 110 generated by the reference image acquisition unit may be converted (810) to a gray scale image 120, and the gray scale image 120 may be converted (820) to a contour image 130. For further detailed analysis, the contour image 130 may be converted (830) into a three-dimensional (3D) contour image 140. However, an example embodiment is not limited thereto, and the above operations may be changed to, for example, directly converting the gray scale image 120 to the 3D contour image 140 or directly converting the reference image 110 to the contour image 130.

As described above, since the images 110, 120, 130, and 140 related to the reference image acquisition unit are based on the reference image 110 with less deterioration in image quality, the shapes thereof may be similar to a circular shape.

Referring to FIG. 9, an evaluation image 210 generated by the evaluation image acquisition unit may be converted (910) to a gray scale image 220, and the gray scale image 220 may be converted (920) to a contour image 230. For further detailed analysis, the contour image 230 may be converted (930) into a 3D contour image 240. However, an example embodiment is not limited thereto, and the above operations may be changed to, for example, directly converting the gray scale image 220 to the 3D contour image 240 or directly converting the reference image 210 to the contour image 230.

As described above, since the images 210, 220, 230, and 240 related to the evaluation image acquisition unit are based on the evaluation image 210, which have the deterioration of image quality, the shapes thereof may not be a circular shape, and may have a different shape. For example, the shape of the images 210, 220, 230, and 240 may be determined based on a predetermined pattern of the display panel included in the evaluation image acquisition unit.

Figure 10:
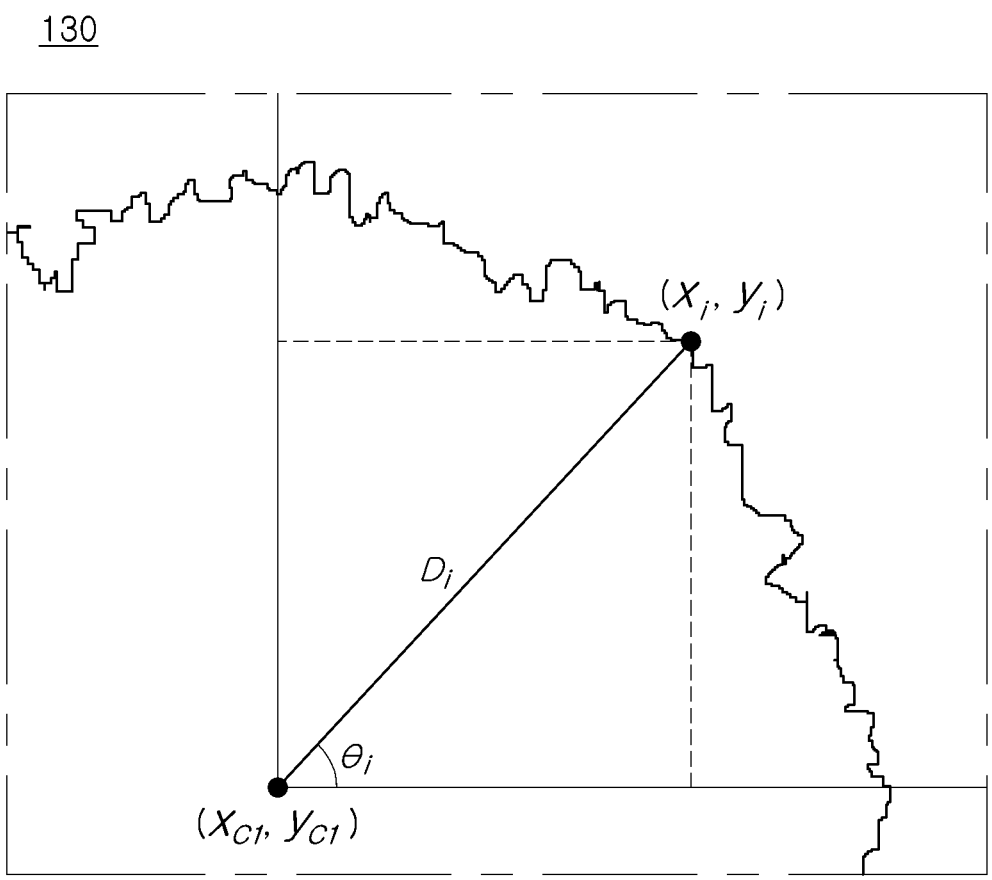
FIGS. 10 and 11 are diagrams illustrating a parameter used in analysis of an image with respect to a method of evaluating performance of an under-display camera according to example embodiments.
Figure 11:
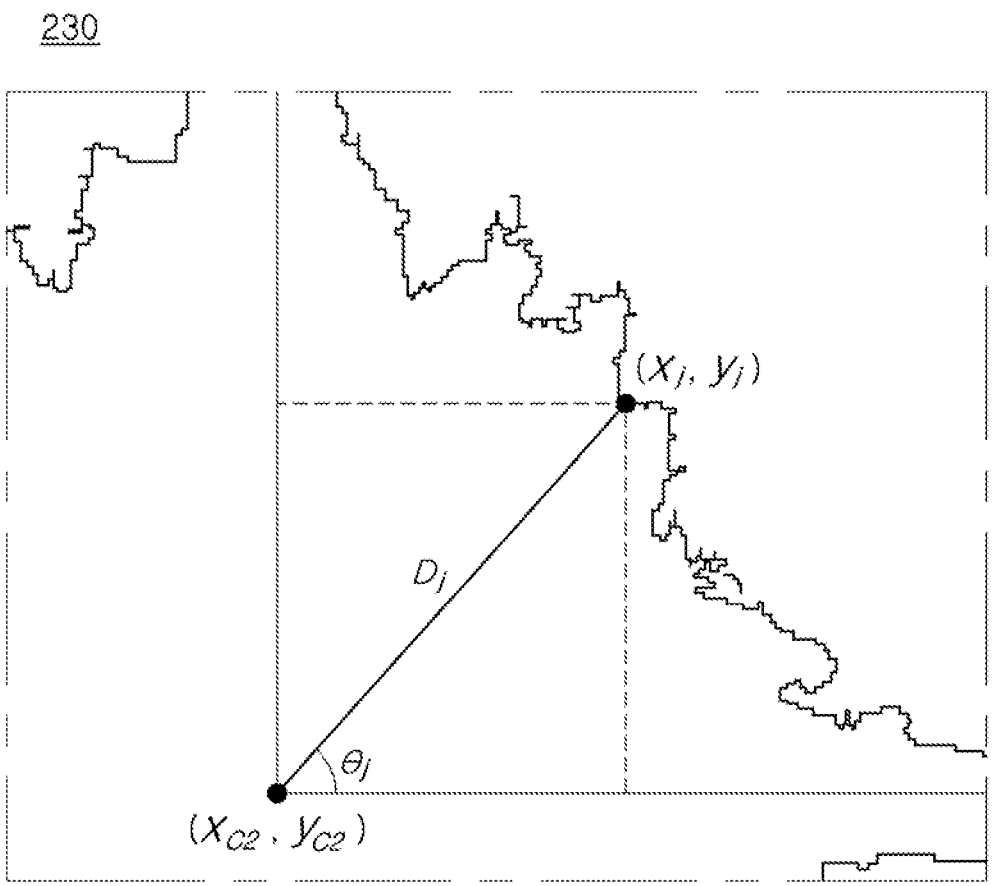

FIGS. 10 and 11 are diagrams illustrating a parameter used in analysis of an image with respect to a method of evaluating performance of an under-display camera according to an example embodiment.

FIG. 10 illustrates an enlarged portion of the contour image 130 based on the reference image 110 illustrated in FIG. 8, and FIG. 11 illustrates an enlarged portion of the contour image 230 based on the reference image 210 illustrated in FIG. 9.

According to the method for evaluating performance of the under-display camera in an example embodiment, a reference value and a feature value may be calculated by quantifying a degree to which an area having the same intensity of light is similar to a circular shape from the generated contour images 130 and 230.

Referring to FIG. 10, in each of a plurality of positions having coordinates of $(x_i, y_i)$ on the contour image 130 (or a boundary of the contour image 130), the reference value may be calculated based on a phase angle $(\theta_i)$ with respect to a center of the contour image 130 having coordinates of $(x_{C1}, y_{C1})$ and a distance Di from the center of the contour image 130 to the plurality of positions.

Referring to FIG. 11, in each of the plurality of positions having coordinates of $(x_j, y_j)$ on the contour image 230 (or a boundary of the contour image 230), the feature value may be calculated based on a phase angle $(\theta_j)$ with respect to the center of the contour image 230 having coordinates of $(x_{C2}, y_{C2})$ and a distance Dj from the center of the contour image 230 to the plurality of positions.

Parameters for calculating the reference value and the feature value may be derived from Equations 1 and 2 as below.

$$\theta_i = \operatorname{atan}\left(\frac{x_i - x_{C1}}{y_i - y_{C1}}\right)$$

$$\theta_j = \operatorname{atan}\left(\frac{x_j - x_{C2}}{y_j - y_{C2}}\right)$$

[Equation 1]

$$D_i = \sqrt{(x_i - x_{C1})^2 + (y_i - y_{C1})^2}$$

$$D_j = \sqrt{(x_j - x_{C2})^2 + (y_j - y_{C2})^2}$$

[Equation 2]

The phase angle and the distance parameters derived from Equations 1 and 2 may be used to indicate coordinates of the plurality of positions on the contour images 130 and 230. Also, the parameters may be used to calculate the reference value and the feature value.

Figure 12:
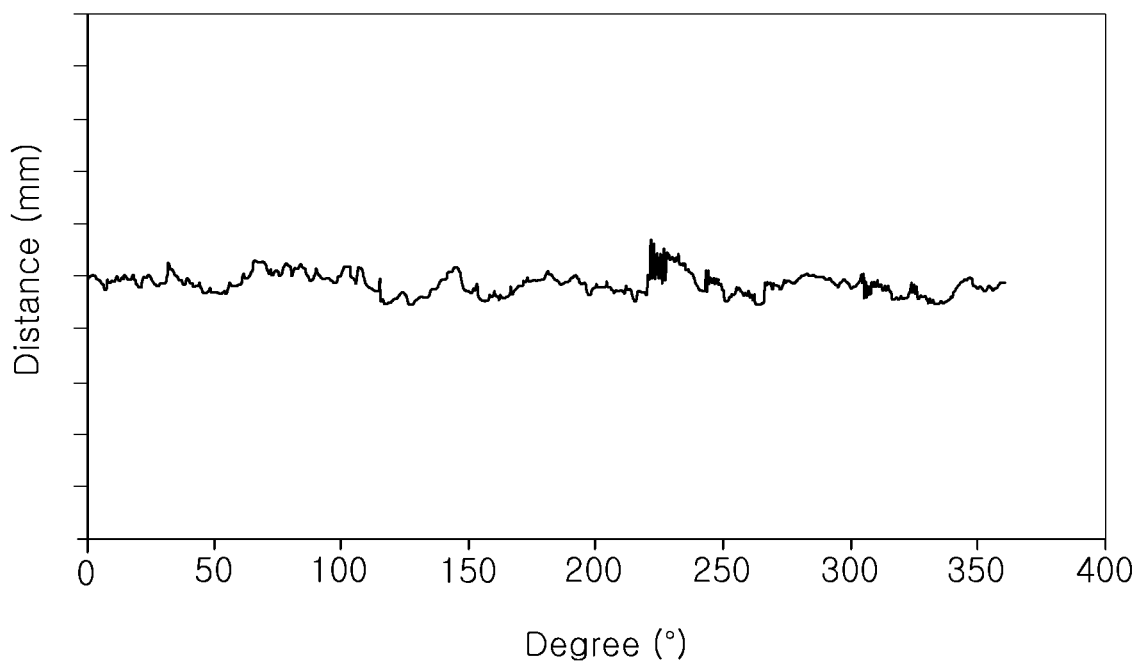
FIGS. 12 and 13 are diagrams illustrating a method of calculating a reference value and a feature value with respect to a method of evaluating performance of an under-display camera according to example embodiments.
Figure 13:
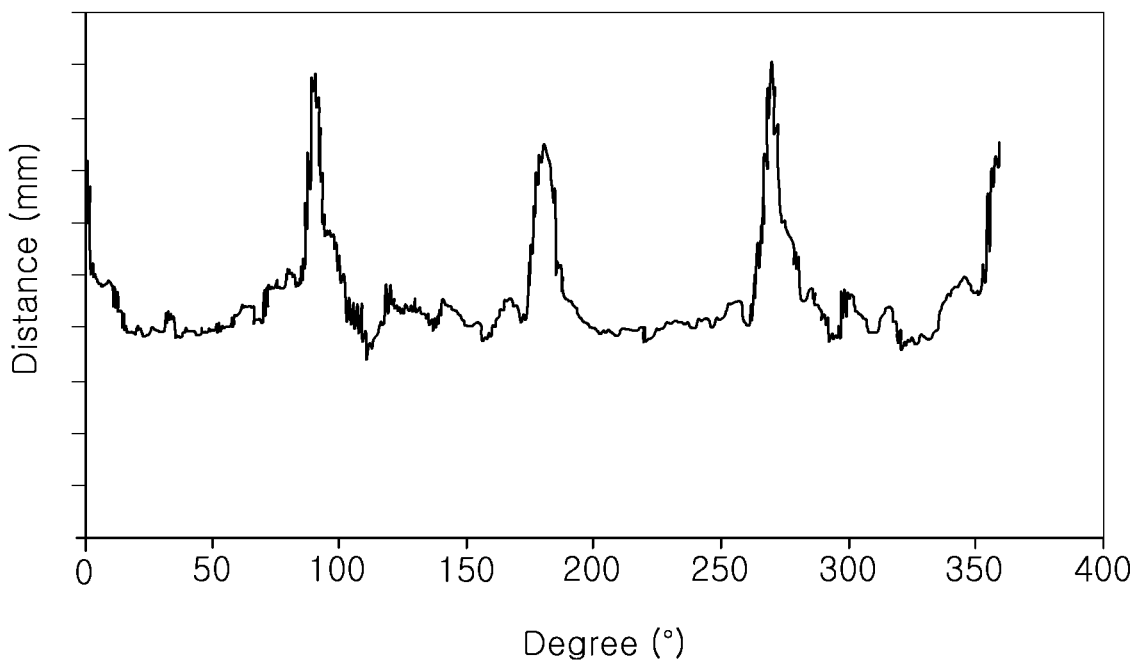

FIGS. 12 and 13 are diagrams illustrating a method of calculating a reference value and a feature value with respect to a method of evaluating performance of an under-display camera according to an example embodiment.

FIG. 12 may be a diagram illustrating each position on the contour image 130 illustrated in FIG. 10 according to a distance and a phase angle, and FIG. 13 may be a diagram illustrating each position on the contour image 230 illustrated in FIG. 11 according to a distance and a phase angle. For example, it may be determined that the smaller the fluctuation in the graph illustrated in FIG. 13, the more the contour image 230 converted from the evaluation image 210 may be similar to a circular shape.

Based on the above process, a reference value and a feature value may be calculated from FIGS. 12 and 13, respectively. For example, the reference value and the feature value may include at least one of an amplitude of diffraction, a standard deviation of diffraction, and an average of diffraction.

As an example, the amplitude of diffraction may be defined as a difference between a distance to a position in which the distance is the maximum and a distance to a position in which the distance is the minimum in FIGS. 12 and 13. The amplitude of diffraction may be calculated from Equation 3 as below.

$$\text{Amplitude}_{diffraction} = D_{max} - D_{min}$$

[Equation 3]

The standard deviation of diffraction may be defined as a standard deviation of the distance for overall phase angles in FIGS. 12 and 13. The standard deviation of diffraction may be calculated from Equation 4 as below.

$$STDEV_{diffraction} = \sqrt{\sum_{i,j=1}^{n}(D_{i,j} - \overline{D})^2 \times \frac{1}{n}}$$

[Equation 4]

Also, the average of diffraction may be defined as an average of the distances for overall phase angles in FIGS. 12 and 13. The average of diffraction may be calculated from Equation 5 as below.

$$Mean_{diffraction} = \sum_{i,j=1}^{n} D_{i,j} \times \frac{1}{n} = \overline{D}$$

[Equation 5]

The reference value and the feature value may be calculated using one or more of Equations 3 to 5. With respect to the performance evaluation method in an example embodiment, a ratio of the reference value to the feature value may be output as a performance evaluation result. Accordingly, it may be determined that the more the performance evaluation result is approximate to 100%, the less the difference between the evaluation image and the reference image may be, and the better the performance of the evaluation image acquisition unit may be.

When each of the reference value and the feature value includes a plurality of values, there may be a plurality of performance evaluation results. In this case, a score for the performance of the evaluation image acquisition unit may be calculated based on the plurality of performance evaluation results. For example, the score for the performance of the evaluation image acquisition unit may be an average value of a plurality of performance evaluation results. However, an example embodiment is not limited thereto, and a score for the performance of the evaluation image acquisition unit may be calculated by assigning a weight to each of the performance evaluation results. Scores calculated for a plurality of under-display cameras may be compared with each other, thereby determining an under-display camera having better performance.

FIG. 14 is a diagram illustrating a performance evaluation result of a method of evaluating performance of an under-display camera according to an example embodiment.

The performance evaluation results and scores according to the method of evaluating performance of the under-display camera in an example embodiment described with reference to FIGS. 1 to 13 may be obtained as in FIG. 14 as an example.

Referring to FIG. 14, the reference value calculated based on the reference image generated by the reference image acquisition unit may be X0, Y0, and Z0, and the feature value calculated based on the evaluation image generated by the evaluation image acquisition unit may be X1, Y1, and Z1. For example, X, Y, and Z may correspond to an average of diffraction, a standard deviation of diffraction, and an amplitude of diffraction, respectively.

Based on the calculated reference value and the feature value, the result of evaluating performance of the under-display camera in the example embodiment may be obtained as 75%, 10%, and 15%, respectively. When the score is calculated from the average of the performance evaluation results, the score may be determined to be 33.3%.

Figure 15:
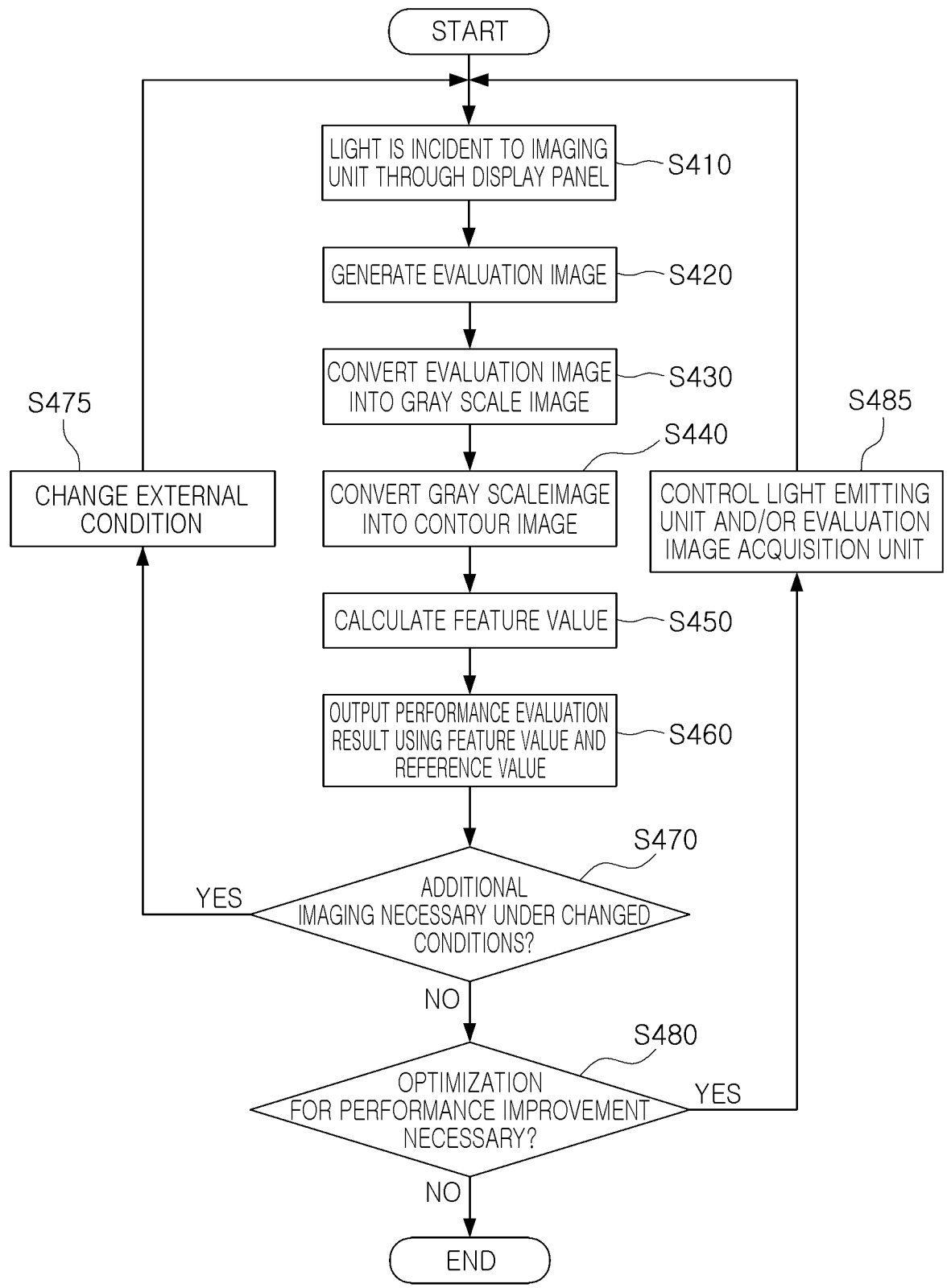
FIG. 15 is a flowchart illustrating a method of evaluating performance of an under-display camera according to an example embodiment.

FIG. 15 is a flowchart illustrating a method of evaluating performance of an under-display camera according to an example embodiment.

Referring to FIG. 15, the method for evaluating the performance of the under-display camera in the example embodiment illustrated in FIGS. 1 to 14 may further improve performance of the under-display camera by adding a feedback process.

Operations S410 to S460 of generating a reference image and an evaluation image, calculating a reference value and a feature value, and outputting a performance evaluation result therefrom may correspond to the operations illustrated in FIGS. 3, 6, and 7. For example, in an example embodiment, light may be incident to an imaging unit through a display panel (S410), and an evaluation image may be generated by imaging the incident light (S420). Thereafter, the evaluation image may be converted into a gray scale image (e.g., black and white image) (S430), the gray scale image may be converted into a contour image (S440), and a feature value may be calculated (S450). The reference value may be calculated by the same method except that light that does not pass through the display panel is imaged, and a performance evaluation result for the evaluation image acquisition unit may be output based on the feature value and the reference value (S460).

The evaluation image generated in the above operation(s) may be a first evaluation image, the calculated feature value may be a first feature value, and the performance evaluation result based on the first feature value may be a first performance evaluation result.

The first performance evaluation result may be output, and it may be determined whether to change an external condition and to perform additional performance evaluation (S470). As an example, the external condition may include presence of noise and intensity of noise of when an image is generated by the imaging unit. As an example, noise may refer to external light, but an example embodiment is not limited thereto. When additional imaging under changed conditions is necessary, an external condition for evaluating performance of the evaluation image acquisition unit may be changed (S475).

Thereafter, a second evaluation image may be generated through the same operations S410 to S460, and a second feature value may be calculated from the second evaluation image. A second performance evaluation result may be output by comparing a second feature value with the reference value. In this case, the reference value may have a value different from an existing reference value according to changes in external conditions, but an example embodiment is not limited thereto. By defining the external conditions evaluated as above, influence of noise may be reduced, and performance of the under-display camera having been objectively quantified may be evaluated.

With respect to the method for evaluating performance of the under-display camera in an example embodiment, an optimization for improving the performance of the under-display camera may be performed separately from the operation S470. For example, a first performance evaluation result may be output, and it may be determined whether the performance of the evaluation image acquisition unit may be improved by controlling an evaluation device (S480). When performance improvement is possible, the controller may control at least one of the light emitting unit, the display panel, and the imaging unit based on the first performance evaluation result before generating the second evaluation image (S485).

Thereafter, a second evaluation image may be generated through the same operations S410 to S460, and a second feature value may be calculated from the second evaluation image. An improved second performance evaluation result may be output by comparing the second feature value with the reference value.

Although not illustrated in FIG. 15, with respect to the method of evaluating performance of the under-display camera in an example embodiment, performance evaluation result prediction according to adjustment of the under-display camera may be performed separately from the operations S470 and S480. For example, even in a state in which the performance evaluation device is not physically controlled as in S485, the second performance evaluation result according to changes in the light emitting unit, the display panel, and the imaging unit may be predicted based on the first performance evaluation result. As an example, a performance evaluation result of when a regular pattern included in the display panel has a different shape may be predicted.

From the performance evaluation result predicted according to the change in the performance evaluation device, the development direction of the under-display camera may be easily determined. Also, the predicted performance evaluation result may be used for diffraction correction to improve performance of the under-display camera, and also for calibration for maximizing performance during mass production.

When the first performance evaluation result and the second performance evaluation result include a plurality of values, a first score calculated based on the first performance evaluation result, and a second score calculated based on the second performance evaluation result may be calculated. For example, the score for the performance of the evaluation image acquisition unit may be an average value of a plurality of performance evaluation results. However, an example embodiment is not limited thereto, and a score for performance of the evaluation image acquisition unit may be calculated by assigning weights to each of the performance evaluation results. Whether to improve the performance may be confirmed by comparing the scores calculated according to the feedback operation of the under-display camera. As an example, the second score based on the second performance evaluation result in FIG. 15 may be greater than the first score based on the first performance evaluation result.

The output performance evaluation result may contribute to determining a process standard of each of elements included in an electronic device including an under-display camera. Also, a level of mass production of a product may be determined based on the output performance evaluation result.

FIG. 16 is a diagram illustrating a performance evaluation result of a method of evaluating performance of an under-display camera according to an example embodiment.

The performance evaluation results and scores according to the method of evaluating performance of the under-display camera in an example embodiment described with reference to FIGS. 1 to 15 may be obtained as in FIG. 16 as an example.

For example, the performance evaluation may be sequentially performed under a first condition in a dark state and a second condition in which a certain amount of noise is present. Also, optimization of the evaluation device may be performed, and performance evaluation may be performed sequentially under the first condition and the second condition again.

Under the first condition, the reference values calculated based on the reference image generated by the reference image acquisition unit may be X01, Y01, Z01, and first feature values calculated based on the first evaluation image generated by the evaluation image acquisition unit may be X11, Y11, and Z11. Under the second condition, the reference values may be X02, Y02, and Z02, and the first feature values calculated based on the first evaluation image may be X12, Y12, and Z12. For example, X, Y, and Z may correspond to an average of diffraction, a standard deviation of diffraction, and an amplitude of diffraction, respectively.

Based on the reference value and the first feature value calculated under the first condition, the performance evaluation results of the under-display camera in the example embodiment may be obtained as 75%, 10%, and 15%, respectively. When a score is calculated by an average of the performance evaluation results, the score may be determined to be 33.3%.

Based on the reference value and the first feature value calculated under the second condition, the performance evaluation results of the under-display camera in the example embodiment may be obtained as 80%, 15%, and 20%, respectively, and when a score is calculated by an average of the performance evaluation results, the score may be determined to be 38.3%.

As described above, when a certain amount of noise is present, the result of evaluating performance of the under-display camera may have a higher score. However, an example embodiment is not limited thereto. As an example, each of the performance evaluation result values illustrated in FIG. 16 may be varied in example embodiments. Also, the result of evaluating performance of the under-display camera may be a lower score under the second condition in which noise is present.

After the performance evaluation based on the first feature value is terminated, an operation of controlling the evaluation device may be performed to improve the performance of the evaluation image acquisition unit. Accordingly, a second performance evaluation result different from the first performance evaluation result may be output.

The second feature value may be calculated under each of the first and second conditions, and may be compared with the reference value. For example, under the first condition, the second feature values calculated based on the second evaluation image generated by the evaluation image acquisition unit may be X21, Y21, and Z21. Under the second condition, the second feature values calculated based on the second evaluation image may be X22, Y22, and Z22.

Based on the reference value and the second feature value calculated under the first condition, the result of evaluating performance of the under-display camera in the example embodiment may be obtained as 85%, 30%, and 35%, respectively. When the score is calculated by an average of the performance evaluation results, the score may be determined to be 50%.

Based on the reference value and the second feature value calculated under the second condition, the results of evaluating performance of the under-display camera in the example embodiment may be obtained as 90%, 45%, and 50%, respectively, and when the score is calculated by an average of the performance evaluation results, the score may be 61.6%.

As described above, by undergoing the feedback operation for the under-display camera, the performance evaluation result may have a higher score. However, an example embodiment is not limited thereto. As an example, each of the performance evaluation result values illustrated in FIG. 16 may be varied in example embodiments. Also, the result of evaluating performance of the under-display camera may be a lower score under the second condition in which noise is present.

According to the aforementioned example embodiments, the under-display camera may obtain the evaluation image using the evaluation image acquisition unit including a UDC, and based thereon, a feature value for quantitatively evaluating the performance of the UDC, and a performance evaluation result may be obtained. Accordingly, the UDC may be controlled according to the performance evaluation result. For example, the development direction of a UDC may be determined, and optimization to improve performance of the UDC may be performed.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While some example embodiments have been illustrated and described above, it will be apparent to those skilled in the art that modifications and variations may be made without departing from the scope of the disclosure as defined by the appended claims and their equivalents.

What is claimed is:

1. An under-display camera disposed below a display and configured to generate an image based on a light passing through the display,
wherein an image acquisition unit including the under-display camera is configured to generate an evaluation image based on a first light, by using an imaging unit including an image sensor, the first light being output by a light emitting unit, including a light source, and passing through a display panel, and
wherein the under-display camera is controlled based on a result of evaluating a performance of the under-display camera, the result being obtained by calculating a feature value based on the evaluation image, calculating a reference value based on a reference image, and comparing the feature value with the reference value, the reference image being obtained based on a second light output by the light emitting unit, the second light not passing the display panel.

2. The under-display camera of claim 1, wherein the result of evaluating the performance is obtained based on a ratio of ratio of the reference value to the feature value.

3. The under-display camera of claim 1, wherein the result of evaluating the performance is obtained by converting the evaluation image to a gray scale image and obtaining the feature value based on the gray scale image.

4. The under-display camera of claim 1, wherein the result of evaluating the performance is obtained by converting the evaluation image to a contour image and obtaining the feature value based on the contour image.

5. The under-display camera of claim 1, wherein the result of evaluating the performance by calculating the feature value based on a first degree to which an outline of the evaluation image is similar to a circular shape.

6. The under-display camera of claim 5, wherein the result of evaluating the performance is obtained by calculating the reference value based on a second degree to which an outline of the reference image is similar to the circular shape, and comparing the first degree with the second degree.

7. An under-display camera configured to, when disposed below a display, generate an image based on a light passing through the display,
wherein an image acquisition unit including the under-display camera is configured to generate an evaluation image based on a first light by using an imaging unit including an image sensor, the first light being output by a light emitting unit, including a light source, and passing through a display panel, and
wherein the under-display camera is controlled based on a result of evaluating a performance of the under-display camera, the result being obtained by converting the evaluation image to a contour image; calculating, in each of a plurality of positions on an outline of the contour image, a feature value based on a relative location of each position with respect to a center of the contour image; and comparing the feature value with a reference value obtained from a reference image, the reference image being obtained based on a second light not passing through the display panel.

8. The under-display camera of claim 7, wherein the wherein the contour image is obtained by converting the evaluation image to a gray scale image, converting the gray scale image to the contour image.

9. The under-display camera of claim 7, wherein each of the reference value and the feature value includes at least one of an amplitude of diffraction, a standard deviation of diffraction, or an average of diffraction.

10. The under-display camera of claim 9, wherein each of the reference value and the feature value includes the amplitude of diffraction, which is defined by a difference between a maximum distance to a first position on the outline of the contour image from the center of the contour image and a minimum to a second position on the outline of the contour image from the center of the contour image, among the plurality of positions.

11. The under-display camera of claim 9, wherein each of the reference value and the feature value includes the standard deviation of diffraction, which is defined as a standard deviation of a distance from the center of the contour image to the plurality of positions.

12. The under-display camera of claim 9, wherein each of the reference value and the feature value includes the average of diffraction, which is defined as an average of distances from the center of the contour image to the plurality of positions.

13. The under-display camera of claim 7, wherein the relative location of each position is defined by a phase angle with respect to the center of the contour image and a distance from the center of the contour image.

14. An under-display camera disposed below a display and configured to generate an image based on a light passing through the display,
wherein an image acquisition unit including the under-display camera is configured to generate a first evaluation image and a second evaluation image based on a first light, by using an imaging unit including an image sensor, the first light being output by a light emitting unit, including a light source, and passing through a display panel, and
wherein the under-display camera is controlled based on a result of evaluating a performance of the under-display camera, the result being obtained by calculating a first feature value based on the first evaluation image and calculating a second feature value based on the second evaluation image; and obtaining a first performance evaluation result by comparing the first feature value with a reference value obtained from a reference image and obtaining a second performance evaluation result by comparing the second feature value with the reference value, the reference image being obtained based on a second light not passing through the display panel.

15. The under-display camera of claim 14, wherein the image acquisition unit is further configured to generate the first evaluation image and the second evaluation image under different external conditions.

16. The under-display camera of claim 15, wherein the different external conditions relate to a presence of a noise and an intensity of the noise with respect to the first evaluation image or the second evaluation image.

17. The under-display camera of claim 14, wherein the imaging unit of the image acquisition unit is controlled based on the first performance evaluation result prior to generation of the second evaluation image.

18. The under-display camera of claim 14, wherein, based on the first performance evaluation result and the second performance evaluation result respectively including a plurality of values, the performance of the under-display camera is evaluated by calculating a first score from the plurality of values of the first performance evaluation result and a second score from the plurality of values of the second performance evaluation result.

19. The under-display camera of claim 14, wherein a diffraction correction is performed on the under-display camera based on the result of evaluating the performance.

20. The under-display camera of claim 14, wherein the under-display camera is controlled based on the first performance evaluation result such that, after the controlling, the image acquisition unit is configured to generate the second evaluation image of which the second feature value is closer to the reference value.

* * * * *